UNITED STATES PATENT OFFICE.

ALFRED FELLOWS, OF MAQUOKETA, IOWA.

CLEANING AND PREPARING SPANISH MOSS.

SPECIFICATION forming part of Letters Patent No. 239,948, dated April 12, 1881.

Application filed December 1, 1880. (No specimens.)

*To all whom it may concern:*

Be it known that I, ALFRED FELLOWS, a citizen of the United States, residing at Maquoketa, in the county of Jackson and State of Iowa, have invented certain new and useful improvements in cleaning and preparing the moss growing on the trees in the southern climate, commonly known as "Spanish Moss;" and I do hereby declare the following is a full, clear, and exact description of the invention, which will enable others skilled in the art to which it appertains to make and use the same.

My invention consists of an improved process for preparing and cleaning moss, as hereinafter described.

Heretofore what is known as "Spanish moss" has usually been prepared by placing it in a body and allowing it to heat and sweat until the sheath on the moss is decomposed. That process requires too much time and is attended with too much expense, both of which difficulties are avoided and at the same time the quality of the moss is improved by my improved process, which consists in the treatment of the moss in a solution of equal parts of carbonate of soda and soda-ash. This solution is made by using from one (1) to six (6) ounces of the mixture of equal parts of the above-named ingredients to one (1) gallon of water. The solution acts quickly on the sheath of the moss, causing it to decompose rapidly, and the solution may be used cold or hot. When used cold it will require from three to five days to accomplish the required result; but when used at boiling heat it will do its work in from two to four hours. After the sheath is decomposed the moss is thoroughly washed in clean water, and is then colored as desired. This process renders the moss elastic and imparts to it a fine glossy appearance, and besides the saving in time and expense, as above named, prepares the moss better, in condition and appearance, for its uses than that prepared by the old process.

The above-named ingredients may be used in this process separately or together; but I prefer to use them together.

What I claim as new, and desire to secure by Letters Patent, is—

The process of treating moss in a liquor made of carbonate of soda and soda-ash, in equal parts, and water, in the proportions and in the manner substantially as and for the purposes described.

In testimony that I claim the foregoing as my own invention I affix my signature in presence of two witnesses.

ALFRED FELLOWS.

Witnesses:
CHAS. A. FELLOWS,
J. E. FAIRBROTHER.